No. 22,564. PATENTED JAN. 11, 1859.
J. MARVIN.
TAPER GAGE FOR CARPENTERS.

Witnesses:
John A. Havens
George Bul

Inventor:
John Marvin

UNITED STATES PATENT OFFICE.

JOHN MARVIN, OF BELLPORT, NEW YORK.

TAPER-GAGE FOR CARPENTERS.

Specification of Letters Patent No. 22,564, dated January 11, 1859.

*To all whom it may concern:*

Be it known that I, JOHN MARVIN, of Bellport, in the county of Suffolk and State of New York, have invented a new and useful Implement or Device which I term a "Taper-Gage;" and I do hereby declare that the following is a full, clear, and exact description of the same, reference being had to the annexed drawings, making a part of this specification, in which—

Figure 1:
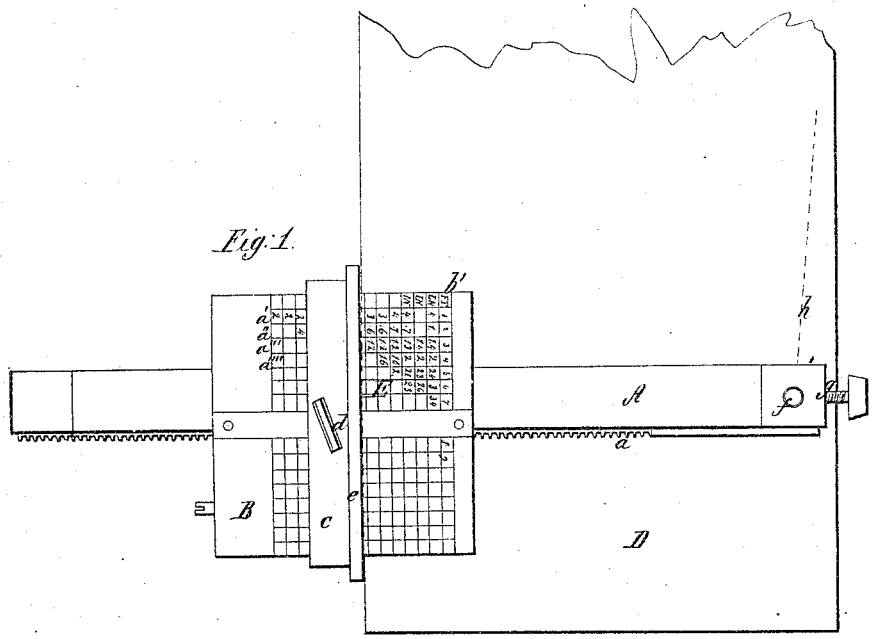
Figure 2:
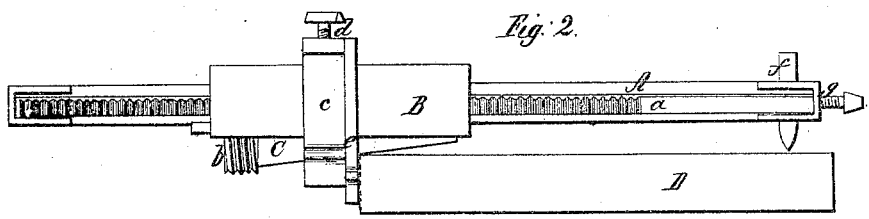
Figure 3:
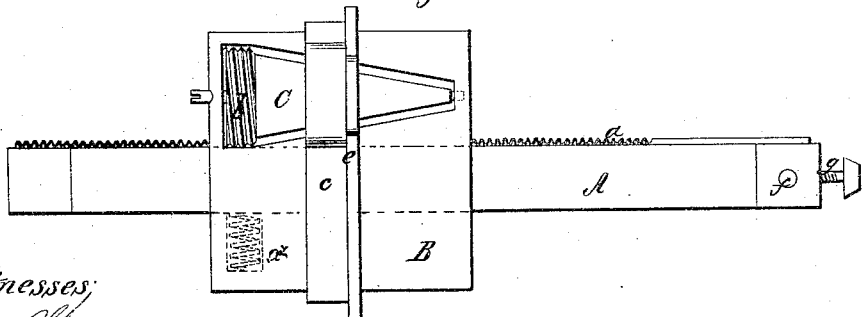

Figure 1, is a plan or top view of my invention. Fig. 2, is a side view of ditto. Fig. 3, is an inverted plan of ditto.

Similar letters of reference indicate corresponding parts in the several figures.

The object of this invention is to obtain a gage that will scribe a line having an oblique position relatively with the edge of the "stuff," plank or board against which the fence of the gage bears as it is shoved along, and from which the work is to be cut or formed, and one that is capable of being so adjusted that the line may be made more or less taper as required.

The invention is designed for joiners, ship carpenters and other artisans, chiefly in wood, and is intended to facilitate the marking or "laying out" of taper work technically termed "diminished" by obviating the hitherto necessary and comparatively tedious operation of measuring off and marking by a straight edge or chalk line.

To enable those skilled in the art to fully understand and construct my invention I will proceed to describe it.

A, represents a bar which may be of rectangular form of any suitable length and having a rack at one side of it. The bar A, passes through a mortise in a square block or stock B, in which a conical roller C, is placed, the axis of the cone being parallel with the bar A, as shown clearly in Fig. 3. At the base or larger end of the conical roller there is a screw $b$, attached the diameter of which is equal to that of the base of the conical roller. This screw gears into the rack $a$, as shown clearly in Fig. 3.

On the block or stock B, a metal band $c$, is placed. This band entirely encompasses the block or stock B, is allowed to slide freely thereon and it may be secured at any desired point by a set screw $d$. On one side of the band $c$, there is a flanch $e$, which serves as a fence or bearing for the gage and rests against the side or edge of the "stuff" to be marked, see Figs. 1 and 2, in which the implement is shown applied to its work, the "stuff" being shown in red and designated by D.

On the upper surface of the block or stock B, there is a table E, the outer line or division of which is marked Ft., and the divisions are shown in inches. This table is for the adjustment of the band $c$, and fence $e$.

In one end of the bar A, a pencil $f$, is placed, and secured by a thumb screw $g$, and within the block or stock B, a spiral spring $a^x$, may be placed which bears against the bar A, and prevents the casual slipping or moving of the block or stock on the bar A, by keeping the screw $b$, in gear with the rack $a$.

When the implement or gage is applied to its work, the fence $e$, being against one edge of the "stuff" D, the pencil $f$, projecting over on the "stuff" and the gage shoved along, it will be seen that the conical roller C, will be rotated, as said roller at a point adjoining the fence rests or bears on the upper surface of the stuff. The roller C, will therefore in consequence of the attachment of the screw $b$, to it and said screw gearing into the rack $a$, move the bar A, longitudinally and the pencil $f$, will make an oblique mark relatively with the edge of the board or "stuff" see red dotted line $h$, Fig. 1. The line $h$, may be made more or less taper by adjusting the bar $c$, and fence $e$, on the block or stock B. By this adjustment the conical roller C, may be made to bear upon the "stuff" D, at any point on its periphery and the bar A, moved with a quicker or slower speed, according to the diameter of the portion of the roller C, that bears on the stuff, the smaller the diameter of the portion of the roller C, that bears on the stuff the quicker will be the movement of the bar A, and vice-versa. The table E, therefore is so arranged that it will serve as a guide to adjust the band and gage according to the taper desired. The column $a'$, see Fig. 1, denotes the degree of taper in a foot and the other columns $a''$, etc., denote the aggregate taper in the number of feet designated by the number in the row $b'$, at the outer side of the columns $a'$, etc.

This invention is exceedingly simple and will save much time in the way of "laying out" work that is of taper form or diminished. The device may be cheaply constructed at a cost not much exceeding the ordinary parallel gage.

I do not confine myself to the precise mode or arrangement herein shown for connecting the conical roller C, with the rack bar A, for that may be modified in various ways, although the plan herein shown and described would probably be as simple and desirable as any.

Having thus described my invention what I claim as new and desire to secure by Letters Patent, is,

1. The employment or use of a conical roller C, applied to a block or stock B, of the gage and connected with a rack $a$, of the pencil bar A, in the manner shown or in any equivalent way so that the roller will be rotated as the gage is shoved along and the bar A, moved longitudinally by the rotation of the roller so as to produce the desired result.

2. I further claim in combination with the conical roller C, the adjustable band $c$, and fence $e$, applied to the block or stock B, for the purpose of regulating the degree of taper of the line $h$, substantially as described.

JOHN MARVIN.

Witnesses:
JOHN T. HAVENS,
GEORGE PEAL.